March 20, 1956  V. E. EGEVI  2,738,590

CUTTING TOOL SCALE AND TOOL ADJUSTER

Filed May 22, 1951

Valter E. Egevi
Inventor his
ATTORNEY

United States Patent Office 2,738,590
Patented Mar. 20, 1956

2,738,590
CUTTING TOOL SCALE AND TOOL ADJUSTER

Valter E. Egevi, Hagersten, Sweden, assignor to Aktiebolaget Superior, Stockholm, Sweden, a corporation of Sweden Application May 22, 1951, Serial No. 227,725

1 Claim. (Cl. 33—185)

When grinding and adjusting profiled tools in tool holders, cutters, spindles and the like for woodworking, there are often great difficulties in calculating the form of the cutting profile as well as the adjustment of the tool in the holder. This is because the tools often have a large cutting angle which necessitates that the tool profile be extended with regard to the profile of the workpiece.

These difficulties are removed in accordance with the present invention, the principal characteristic of which is a cutting tool scale, the graduation of which corresponds to the extension that must be given to the edge profile of a cutting tool with regard to the profile of a workpiece owing to the fact that the tool is set at a cutting angle determined by a tool holder.

Figure 1:
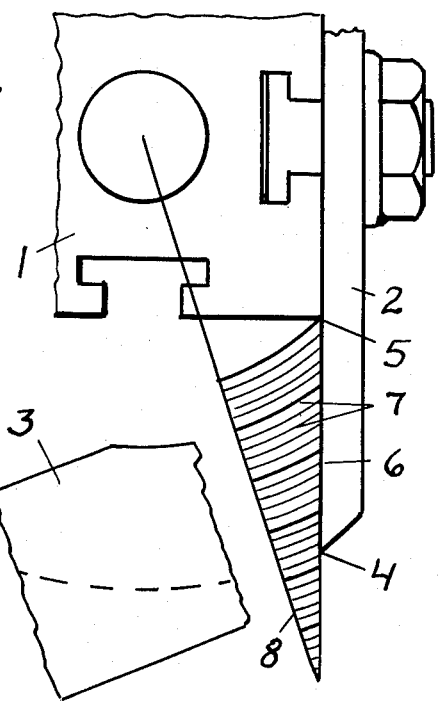
Figure 2:
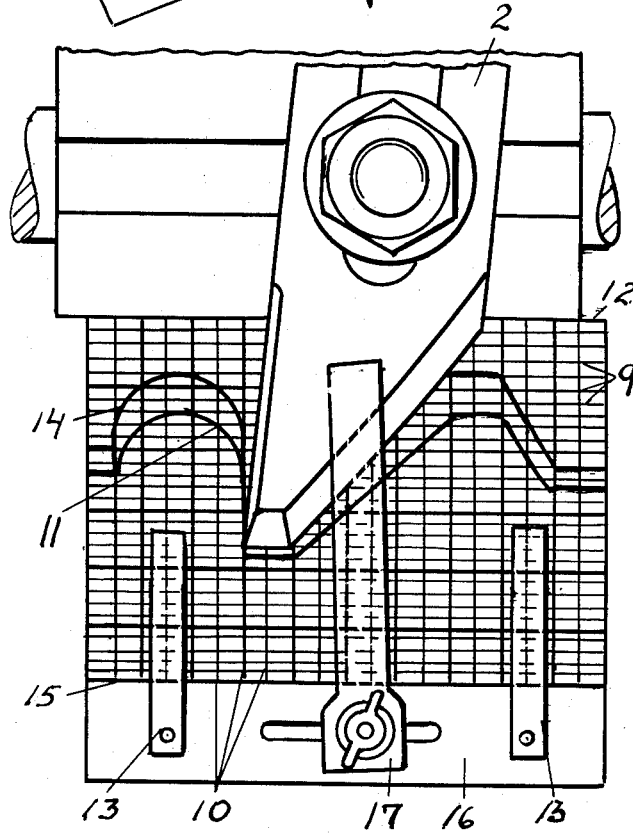

The invention is illustrated in the accompanying drawing in connection with the following specification. Fig. 1 shows an end view of part of a square cutter block, Fig. 2 shows a side view of a cutter block and a tool scale. A cutting tool 2 is screwed fast on the block 1. Since the tool is at a distance from the cutter center determined by the block diameter, it is set at a certain cutting angle with regard to the workpiece 3. This angle is not the same along the entire edge profile but has a smallest value at the outermost tip 4 and increases toward the corner 5 of the cutter. On account of the cutting angle the edge profile of the tool cannot have the same form as the profile of the workpiece but must be extended so as to make the cutting depth of the edge everywhere correspond to the desired profile of the workpiece. This extension is apparent from the intersections of the line of the cutting side 6 of the tool and the circular lines 7 starting from the line 8 graduated in millimeters. For clearness, only every second millimeter has been indicated and the centimeter lines are drawn somewhat heavier. The graduated line is drawn from the cutter center and at 90 degrees angle to the workpiece and thus is the line where the various points of the edge have their maximum cutting depth. The distance between the lines 9 of the scale corresponds to that between the abovementioned intersections. The transverse lines 10 serve as parallels for extending the profile drawing to form an edge profile and for taking measures from the drawing.

A drawing for an edge profile is obtained by drawing the profile 11 of the workpiece on a transparent paper, which is placed over the scale so as to let the scale be visible through the paper. The drawing is placed at the same distance from the edge 12 of the the scale as the workpiece is to have later from the side or edge of the cutter. The edge profile 14 of the tool 2 is obtained by taking, for instance by means of calipers, the distance from a suitable point of the profile line parallel with the transverse lines to the edge 15 of the scale or to some other suitable line of measurement at or below the maximum profile depth. With the distance still in the calipers the length in millimeters of the measured distance is ascertained. The corresponding measure from the scale is taken from the border of the scale or the line of measurement employed and is then marked off straight above the starting point on the profile line. In this manner a suitable number of points are marked off, which are then joined by a line forming the required edge profile of the tool, i. e. the tool is given an edge profile in accordance with this line.

The insertion of the tools in the cutter is done by attaching the drawing by means of a suitable spring 13, clamp, or the like on a plate 16 supporting the scale and which is in turn attached in a similar way to the cutter.

A tool is then inserted in accordance with the drawing and is fastened on the plate by means of a clamp 17. The tool is pushed inwards into the cutter and is screwed fast. The plate is removed and the same procedure is repeated for the insertion of the remaining tools on all sides of the cutter.

Thanks to the millimeter graduation at the edge of the scale it is easy to adjust the plate in the correct axial position.

Obviously, the invention is not limited to the embodiments shown, but these are subject to modification within the scope of the invention. Thus the scale may be engraved directly on the plate used for the insertion of the tool in the cutter. The plate may be provided with an adjustable stop for axial adjustment. The scale may be on transparent paper, in which case the profile of the workpiece may be transferred directly to the scale from the main drawing. In order to facilitate the taking of measures from the scale, numbers may be provided on suitable lines. Obviously, different cutter diameters require different scales.

What is claimed is:

A scale for setting a cutting edge of a tool to produce a desired edge profile in a workpiece comprising a plate having a series of parallel lines thereon, said lines being spaced apart distances corresponding to the extensions required to set the cutting edge to produce the desired edge profile in the workpiece due to the cutting angle of the tool, means for attaching to said plate a transparent drawing of the desired edge profile and means associated with said plate indicating distances measured from a reference line to points on said drawing.

References Cited in the file of this patent
UNITED STATES PATENTS

| | | |
|---|---|---|
| 591,342 | Brown | Oct. 5, 1897 |
| 649,751 | Quinn | May 15, 1900 |
| 660,005 | Davis et al. | Oct. 16, 1900 |
| 672,527 | Hunter | Apr. 23, 1901 |
| 1,578,884 | Farwell | Mar. 30, 1926 |
| 2,165,369 | Grace | July 11, 1939 |

FOREIGN PATENTS

| | | |
|---|---|---|
| 652,849 | Great Britain | May 2, 1951 |